US008981711B2

(12) United States Patent
Aigner et al.

(10) Patent No.: US 8,981,711 B2
(45) Date of Patent: Mar. 17, 2015

(54) SYSTEM FOR CHARGING PORTABLE ELECTRONIC DEVICES HAVING APPARATUS FOR SUSPENDING PORTABLE ELECTRONIC DEVICES FROM A POWER SOURCE

(75) Inventors: Roland Aigner, Hallein/Rif (AT); Karl-Heinz Karpf, Kirchberg (AT)

(73) Assignee: Quipos Solutions GmbH, Wals-Siezenheim (AT)

( * ) Notice: Subject to any disclaimer, the term of this patent is extended or adjusted under 35 U.S.C. 154(b) by 374 days.

(21) Appl. No.: 13/433,767

(22) Filed: Mar. 29, 2012

(65) Prior Publication Data
US 2013/0076302 A1 Mar. 28, 2013

(30) Foreign Application Priority Data
Mar. 30, 2011 (EP) .................................... 11160357

(51) Int. Cl.
*H02J 7/00* (2006.01)
(52) U.S. Cl.
CPC ............. *H02J 7/0052* (2013.01); *H02J 7/0044* (2013.01)
USPC .......................................... 320/107; 320/113
(58) Field of Classification Search
CPC ...... Y02E 60/12; H02J 7/0042; H02J 7/0045; H02J 7/0044; H01M 10/46; H01M 10/44; H01M 2/1022
USPC ....................................................... 320/107
See application file for complete search history.

(56) References Cited

U.S. PATENT DOCUMENTS

| | | | | |
|---|---|---|---|---|
| 3,919,615 A | * | 11/1975 | Niecke | 320/112 |
| 4,591,777 A | | 5/1986 | McCarty et al. | |
| 5,680,026 A | * | 10/1997 | Lueschen | 429/97 |
| 5,900,715 A | | 5/1999 | Roberts | |
| 5,914,585 A | * | 6/1999 | Grabon | 320/125 |
| 8,198,860 B2 | * | 6/2012 | Law | 320/113 |
| 2009/0015195 A1 | | 1/2009 | Loth-Krausser | |
| 2009/0102416 A1 | * | 4/2009 | Burley | 320/103 |

(Continued)

FOREIGN PATENT DOCUMENTS

| | | |
|---|---|---|
| DE | 1 134 756 | 8/1962 |
| EP | 1 487 082 A1 | 12/2004 |

(Continued)

OTHER PUBLICATIONS

European Search Report for EP 1116357.7-2210, date completed Dec. 12, 2011, date mailed Dec. 22, 2011.

*Primary Examiner* — Arun Williams
(74) *Attorney, Agent, or Firm* — Miller, Canfield, Paddock and Ston; Mark L Maki

(57) ABSTRACT

A system for charging portable electronic devices is proposed, which comprises an apparatus (1) for suspending the portable electronic device, which can be connected electrically to a power source and a part (2) for carrying the electronic device, which has means for transferring electrical energy, further comprising means for transferring electrical energy, which can be connected electrically to the electronic device, wherein the part (2) for carrying the electronic device has electrical contact means (9, 10) connected to the means for transferring electrical energy, which by suspending the electronic device by means of the part (2) for carrying the electronic device on the apparatus (1) for suspending the portable electronic device can be connected in an electrically detachable manner to the electrical contact means (6, 8) of the apparatus (1) for suspending the portable electronic device.

7 Claims, 2 Drawing Sheets

(56) References Cited

U.S. PATENT DOCUMENTS

Figure 1:
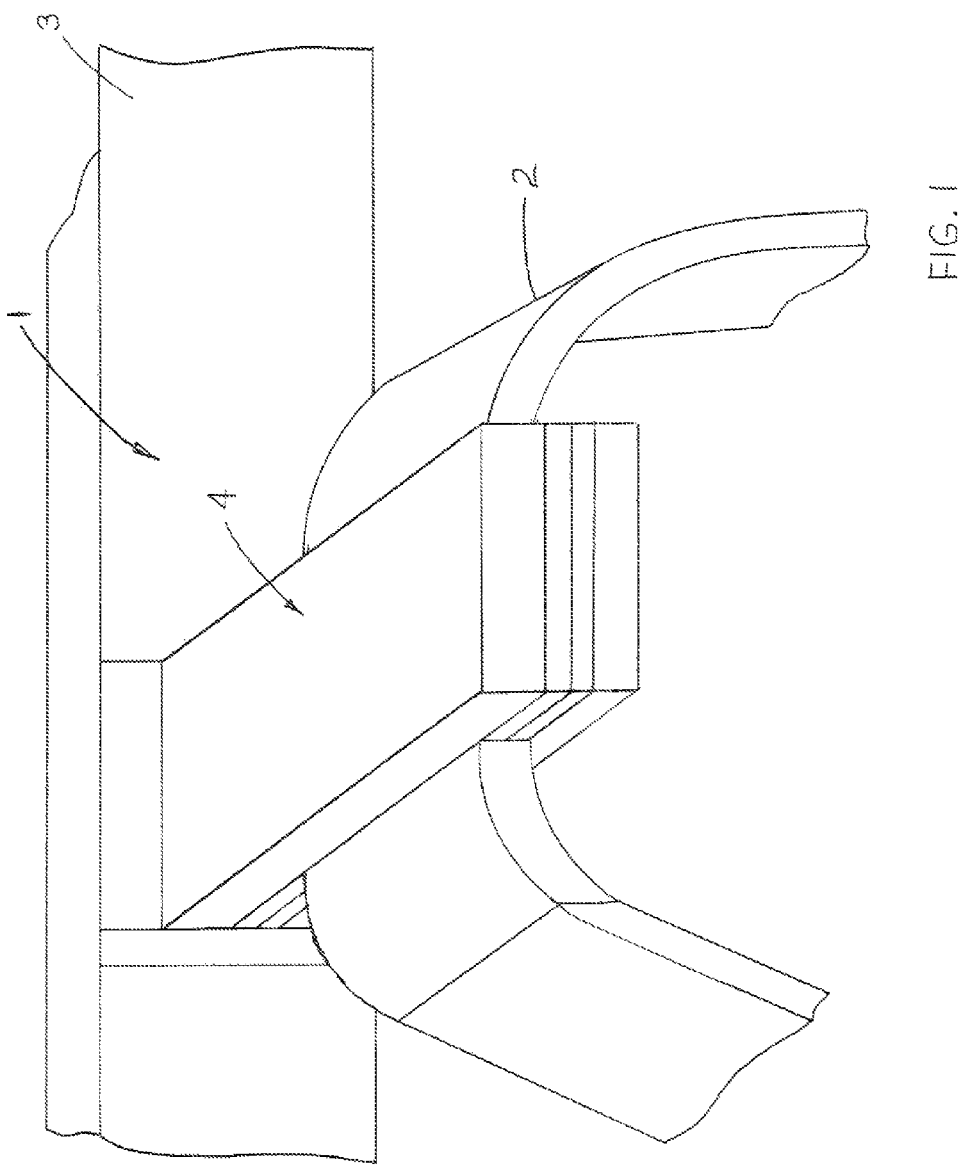

2009/0218884 A1* 9/2009 Soar ................................ 307/11
2011/0133695 A1* 6/2011 Cadway ........................ 320/114

FOREIGN PATENT DOCUMENTS

| EP | 2 015 389 A1 | 1/2009 |
| JP | 2004-248733 A | 9/2004 |

* cited by examiner

SYSTEM FOR CHARGING PORTABLE ELECTRONIC DEVICES HAVING APPARATUS FOR SUSPENDING PORTABLE ELECTRONIC DEVICES FROM A POWER SOURCE

CROSS REFERENCE TO RELATED APPLICATIONS

This application claims priority to EP 11160357.7, filed on Mar. 30, 2011. All applications are incorporated herein by reference in their entireties.

The present invention relates to a system for charging portable electronic devices according to the preamble of claim 1.

It is known from the prior art to charge portable electronic devices by means of special charging cables or via charging cradles which can be connected to a power or USB connection. In the event that several portable devices are to be charged as is the case, for example with portable devices for radio billing systems for the catering trade, or with portable devices of point-of-sale or access control systems in large organisations, the simultaneous charging frequently results in a so-called "cable spaghetti" since each device is assigned a charging cradle with corresponding power cables. This problem is further exacerbated as a result of the carrying belts of the mobile parts so that it is difficult for the users of such devices to charge these devices or remove them from the corresponding charging cradle.

Furthermore, a plurality of charging cradles are required to charge a plurality of portable electronic devices which in turn require a correspondingly large amount of space even when the mobile parts are not being charged.

In particular in the catering trade or in point-of-sales or access control systems in large organisations, where a plurality of mobile parts is required, the available space for charging these devices is usually limited. In addition, this space is not available for further functions or activities.

A further problem known from the prior art is the fact that in the case of portable electronic devices which are held in a bag, these must be removed from the bag for charging which frequently proves inconvenient.

It is the object of the present invention to provide a system for charging portable electronic devices through the use of which the space required for charging is reduced and a so-called "cable salad" is avoided. Furthermore, no additional components are required with the portable devices.

This object is solved by the features of claim 1. Further embodiments according to the invention and advantages are deduced from the subclaims.

Accordingly, a system for charging portable electronic devices is proposed which comprises an apparatus for suspending the portable electronic device, which can be connected electrically to a power source and a part for carrying the electronic device, which can be connected electrically to the electronic device.

According to the invention, the part for carrying the electronic device has means for transferring electrical energy which can be connected to the electronic device and electrical contact means connected to the means for transferring electrical energy, which by suspending the electronic device by means of the part for carrying the electronic device on the apparatus for suspending the portable electronic device can be connected in an electrically detachable manner to the electrical contact means of the apparatus for suspending the portable electronic device. The detachable electrical connection is preferably made by means of a tight fit.

In this case, it is preferably provided that a band of electrically conducting fabric or a cable is integrated or embedded in the part for carrying the electronic device as means for transferring electrical energy, which is connected electrically to the electrical contact means of the part for carrying the electronic device. The band or the cable can be connected electrically to the electronic device.

The part for carrying the electronic device can, for example, be designed as a carrying belt or carrying girdle. The electronic device can be connected directly to carrying belt or to the carrying girdle or it can be connected electrically to a bag or to a sleeve for accommodating the device, which in turn can be connected electrically to the carrying belt or carrying girdle designed according to the invention. The charging of the electronic device can also be accomplished by means of induction for the case where a bag or sleeve is designed to be connected electrically to the carrying belt or carrying girdle so that there is no need for additional cables and plugs between the bag or the sleeve and the electronic device.

Within the framework of the present invention, it can be provided that electrical energy storage devices which can serve as the power supply for the electronic device and are connected to the means for transferring electrical energy are integrated in the part for carrying the electronic device, e.g. in the carrying belt or in the carrying girdle or in the bag or sleeve connected to the carrying belt.

Furthermore, according to a preferred embodiment of the invention it can be provided that by suspending the device on the apparatus for suspending the portable electronic device, in addition to the electrical connection, a data connection can also be made, whereby for example, a data synchronisation or a data transmission from the electronic device to another electronic device, for example, to a computer or server, and conversely can be implemented. In this case, the apparatus for suspending the portable electronic device serves as a type of "docking station".

For this purpose, the part for carrying the electronic device has means for digital data transmission which can be connected to the electronic device for the purpose of data transmission. Furthermore, the part for carrying the electronic device has contact means connected to the means for digital data transmission, which by suspending the electronic device by means of the part for carrying the electronic device on the apparatus for suspending the portable electronic device can be connected detachably to contact means for digital data transmission provided in the apparatus for suspending the portable electronic device so that data synchronisation or data transmission from the electronic device to another electronic device connected to the apparatus for suspending the portable electronic device and conversely is made possible.

Advantageously the electrical contact means of the apparatus for suspending the portable electronic device and of the part for carrying the electronic device can also serve as contact means for digital data transmission, wherein the means for transferring electrical energy provided in the part for carrying the electronic device are also used for digital data transmission. For example, the charging of the electronic device and the digital data transmission can be accomplished on the basis of the USB standard.

The apparatus for suspending the portable electronic device preferably comprises at least one hook connected to a busbar which has electrical contact means. As already explained, the hooks can also comprise contact means for data transmission. As already explained, the hooks can also have contact means for data transmission. In this case, the electrical contact means of the hook and of the part for carrying the electronic device are preferably designed in such a manner that when suspending the electronic device, an electrical connection is made between the contact means of the part for carrying the electronic device and the apparatus for suspending the portable electronic device by means of a tight fit.

In order to increase the stability of the electrical connection, it can be provided within the framework of a further development of the invention that the hooks are designed as a closure hook whereby when the electronic device is suspended, the part for carrying the electronic device is held securely. The closure hook can be provided with a lock to increase the security. The lock can be designed as a conventional lock or as a code lock. In the event that the electrical device is removed without unlocking the lock, it can be provided that the electronic device is deactivated or locked controlled by software.

Within the framework of a further embodiment of the invention, it can be provided that by means of the removal or suspension of the electronic device, a time recording can be made. For example, the time can be recorded as working time in which the electronic device is not suspended on a hook of the apparatus. In order to be able to identify the respective user of the electronic device, in this case it is necessary to be able to identify the particular user of the electronic device, in this case it is necessary to input a code or password which uniquely identifies a user.

A mobile telephone or small portable computer can also be considered to be a portable device in the sense of the invention.

Furthermore, an item of clothing, for example, a jacket, can serve as the part for carrying the electronic device. As already explained, means for transferring electrical energy, for example, in the form of a band of conducting fabric can be integrated in the item of clothing or in the jacket, which means are connected electrically to electrical contact means, which can be provided, for example, in the collar of the jacket, where the item of clothing can be connected electrically to the electronic device carried in the item of clothing. In this case, the electronic device can also be charged by means of induction so that there is no need for additional cables and plugs.

For charging the electronic device carried in the item of clothing, for example, a mobile telephone and/or for the case of a digital data transmission additionally made possible according to the previous embodiments, the item of clothing can be suspended on an apparatus for suspending the portable electronic device designed according to the invention in such a manner that a electrical connection is made between the contact means provided in the item of clothing and the contact means provided in the apparatus for suspending the portable electronic device.

Furthermore according to the invention, a notebook located in a notebook bag can be charged by suspending on a hook designed according to the invention, where in this case a data exchange or a synchronisation of the notebook can be made depending on the desired configuration.

The apparatus for suspending the electronic device can furthermore be installed fixedly or designed as a portable hook strip.

The apparatus for suspending the electronic device can also be designed as a rail which can receive a plurality of devices simultaneously. Within the framework of the invention, the electronic devices can have a recess which serves as the part for carrying the device by which means the electronic device can be suspended on a hook or on a rail.

Furthermore the apparatus for suspending the electronic device can have means by which a free space for charging a device is displayed visually. This can be signalled, for example, by illumination of a green LED lamp.

The concept according to the invention enables a space-saving charging of electronic devices which can additionally satisfy safety aspects. Advantageously electronic devices can also be charged and/or synchronised without needing to remove the parts for carrying the devices which are present anyway. On the contrary, the parts for carrying the devices such as carrying belts, carrying bags and carrying girdles are integrated in the system according to the invention.

Figure 2:
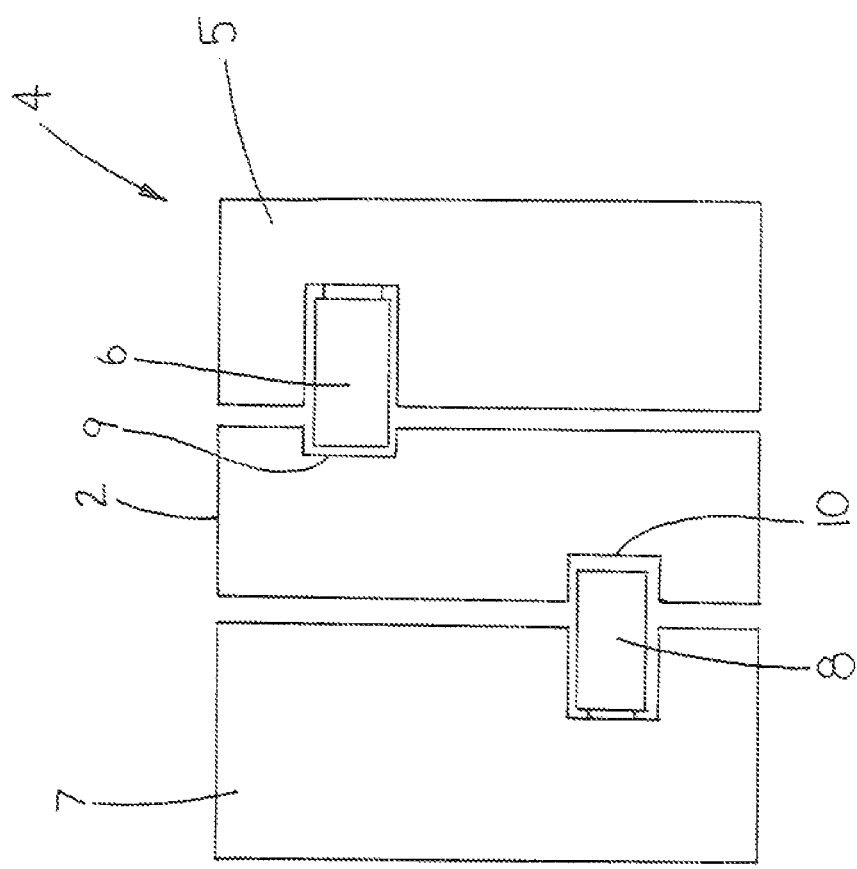

The invention is explained in detail hereinafter with reference to the appended figures as an example. In the figures:

FIG. 1 shows a schematic perspective view of a first embodiment of the invention to illustrate the principle forming the basis of the invention; and FIG. 2 shows a schematic view of the electrical contacting according to a further embodiment of the invention.

With reference to FIG. 1, the system according to the invention for charging portable electronic devices comprises an apparatus 1 for suspending the portable electronic device, which can be connected electrically to a power source, and a part 2 for carrying the electronic device which can be connected electrically to the device not shown in the figure.

In this case, the part 2 for carrying the portable electronic device has contact means which can be connected electrically to electrical contact means of the apparatus 1 for suspending the portable electronic device by suspending the device by means of the part 2 for carrying the device on the apparatus 1 for suspending the portable electronic device, where a band made of electrically conductive fabric is integrated or embedded in the part 2 for carrying the electronic device as means for transferring electrical energy, which is connected to the electrical contact means.

In the example shown in FIG. 1, the part 2 for carrying the electronic device is designed as a carrying belt, According to the invention, the electronic device can be directly connected electrically to the carrying belt or it can be connected electrically to a bag for holding the device which in turn can be connected electrically to the carrying belt.

The apparatus 1 for suspending the portable electronic device shown in FIG. 1 comprises at least one hook 4 connected to a busbar 3, which has electrical contact means. The electrical contact means of the hook 4 and the part 2 for carrying the electronic device are designed in such a manner that when suspending the electronic device on one of the hooks 4, an electrical connection is made between the contact means of the part 2 for carrying the electronic device and the hook 4 of the apparatus 1 for suspending the portable electronic device by means of a tight fit. In this way, the electronic device can be charged when the apparatus 1 for suspending the portable electronic device is connected to a power source.

In the example shown in FIG. 1, the hook 4 is designed as a closure hook. With reference to FIG. 2, the positive contact point 6 is provided on the lower part 5 of the closure hook 4 and the negative contact point 8 is provided on the upper part 7 of the closure hook 4. These contact points are connected electrically to corresponding contact point 9, 10 on the part 2 for carrying the electronic device by suspending the device on the closure hook 4 so that the device can be charged.

For the case where the hook is designed as a single hook, the contact points are provided on the same side of the part 2 for carrying the electronic device in order to enable an electrical connection to be made with the contact points provided on the hook. The stability of the electrical connection between the contact means of the hook and the part for carrying the electronic device is ensured by the weight of the electronic device.

The invention claimed is:

1. A system for charging portable electronic devices, comprising an apparatus (1) electrically connectable with a power source for suspending the portable electronic devices and a part (2) for carrying the electronic device and comprising means for transmitting electric energy, which means are electrically connectable with the electronic device, wherein the part (2) for carrying the electronic device comprises electrical contact means (9, 10) connected with the means for transferring electric energy, which, through suspending the electronic device by means of the part (2) for carrying the electronic device on the apparatus (1) for suspending the portable electronic devices, can be electrically detachably connected with electrical contact means (6, 8) of the apparatus (1) for suspending the portable electronic devices, wherein the part (2) for carrying the electronic device is implemented as a carrying strap or carrying belt, wherein the electronic device is directly connectable with the means for transmitting electric energy or is electrically connectable with a bag or a case for housing the device, which bag is electrically connectable with the means for transmitting electric energy or wherein the part (2) for carrying the electronic device is implemented as a garment, wherein the electronic device is directly electrically connectable with the means for transmitting electric energy provided in the garment, characterised in that the apparatus (1) for suspending the portable electronic devices includes at least one hook (4) connected with a power rail (3) and comprising the electrical contact means (6, 8).

2. The system for charging portable electronic devices according to claim 1, characterised in that the electrical contact means (6, 8) of the apparatus (1) for suspending the portable electronic devices and the contact means (9, 10) of the part (2) for carrying the electronic device are implemented in such a way that when the electronic device is suspended, an electrical connection is created through a form fit between the contact means (9, 10) of the part (2) for carrying the electronic device and the contact means (6, 8) of the apparatus (1) for suspending the portable electronic devices.

3. The system for charging portable electronic devices according to claim 1, characterised in that a band made of electrically conducting fabric or a cable is integrated with, or embedded in, the part (2) for carrying the electronic device as the means for transmitting electric energy.

4. The system for charging portable electronic devices according to claim 1, characterised in that electrical energy storage devices are integrated with the part (2) for carrying the electronic device, the energy storage devices being connected with the means for transmitting electric energy.

5. The system for charging portable electronic devices according to claim 1, characterised in that the hook (4) is implemented as a locking hook.

6. The system for charging portable electronic devices according to claim 1, characterised in that the part (2) for carrying the electronic device comprises means for digital data transmission which are connectable with the electronic device for the purpose of data transmission, wherein the part (2) for carrying the electronic device comprises contact means connected with the means for digital data transmission, which means, through suspending the electronic device by means of the part (2) for carrying the electronic device on the apparatus (1) for suspending the portable electronic devices are detachably connectable with contact means for digital data transmission of the apparatus (1) for suspending the portable electronic devices, so that it is possible to synchronize or transmit data from the electronic device to a further electronic device connected with the apparatus (1) for suspending the portable electronic device and vice versa.

7. The system for charging portable electronic devices according to claim 6, characterised in that the contact means (6, 8) of the apparatus (1) for suspending the portable electronic device and the contact means (9, 10) of the part (2) for carrying the electronic device are also used as contact means for digital data transmission, wherein the means for transmitting electric energy and provided in the part (2) for carrying the electronic device, are also used for digital data transmission.

* * * * *